United States Patent
Kupermann et al.

(10) Patent No.: US 9,141,946 B2
(45) Date of Patent: Sep. 22, 2015

(54) DYNAMIC PAYMENT SERVICE

(75) Inventors: Eli Kupermann, Maale Adumim (IL);
Jasmeet Chhabra, Hillsboro, OR (US);
Irena Riji, Mevaseret Zion (IL); Sanjay Bakshi, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/997,374

(22) PCT Filed: Apr. 17, 2012

(86) PCT No.: PCT/US2012/033966
§ 371 (c)(1),
(2), (4) Date: Mar. 31, 2014

(87) PCT Pub. No.: WO2013/158081
PCT Pub. Date: Oct. 24, 2013

(65) Prior Publication Data
US 2014/0201030 A1    Jul. 17, 2014

(51) Int. Cl.
| | |
|---|---|
| G06Q 30/00 | (2012.01) |
| G06Q 20/10 | (2012.01) |
| G06Q 20/20 | (2012.01) |
| G06Q 20/24 | (2012.01) |
| G06Q 20/32 | (2012.01) |
| G06Q 20/40 | (2012.01) |
| G06Q 30/06 | (2012.01) |

(52) U.S. Cl.
CPC ............ *G06Q 20/10* (2013.01); *G06Q 20/20* (2013.01); *G06Q 20/24* (2013.01); *G06Q 20/32* (2013.01); *G06Q 20/3278* (2013.01); *G06Q 20/40* (2013.01); *G06Q 30/0633* (2013.01)

(58) Field of Classification Search
CPC ........................................................ G06Q 30/00
USPC ........................................................ 705/26.1
See application file for complete search history.

(56) References Cited

U.S. PATENT DOCUMENTS

| | | | |
|---|---|---|---|
| 2006/0116957 A1* | 6/2006 | May et al. ................. | 705/40 |
| 2006/0149686 A1 | 7/2006 | Debonnett | |

FOREIGN PATENT DOCUMENTS

| | | |
|---|---|---|
| KR | 10-2011-0033994 A | 4/2011 |
| WO | 00/55777 A1 | 9/2000 |
| WO | 01/15092 A2 | 3/2001 |

OTHER PUBLICATIONS

International Search Report and Written Opinion received for PCT application No. PCT/US2012/033966, mailed on Dec. 18, 2012, 10 pages.
International Preliminary Report on Patentability received for PCT Application No. PCT/US2012/033966, mailed on Oct. 30, 2014, 7 pages.

* cited by examiner

*Primary Examiner* — Mila Airapetian
(74) *Attorney, Agent, or Firm* — Jordan IP Law, LLC

(57) ABSTRACT

Systems and methods may provide for implementing a dynamic payment service. In one example, the method may generate a request communication including purchase detail information relating to an item to request credit from a vendor to conduct a transaction relating to the item, determine a scope of credit to be issued to conduct the transaction relating to the item based on the purchase detail information, and generate a payment communication including the transaction information to complete the transaction relating to the item.

27 Claims, 2 Drawing Sheets

DYNAMIC PAYMENT SERVICE

BACKGROUND

1. Technical Field

Embodiments generally relate to dynamic payment services. More particularly, embodiments relate to issuing a limited line of credit to a user to complete a transaction.

2. Discussion

Mobile device payment services may require a user to store relevant information on a computer chip onboard a user device. The computer chip may be configured to operate separately from the user device. However, many user devices do not include such to a computer chip onboard.

BRIEF DESCRIPTION OF THE DRAWINGS

The various advantages of the embodiments of the present invention will become apparent to one skilled in the art by reading the following specification and appended claims, and by referencing the following drawings, in which:

DETAILED DESCRIPTION

Figure 1:
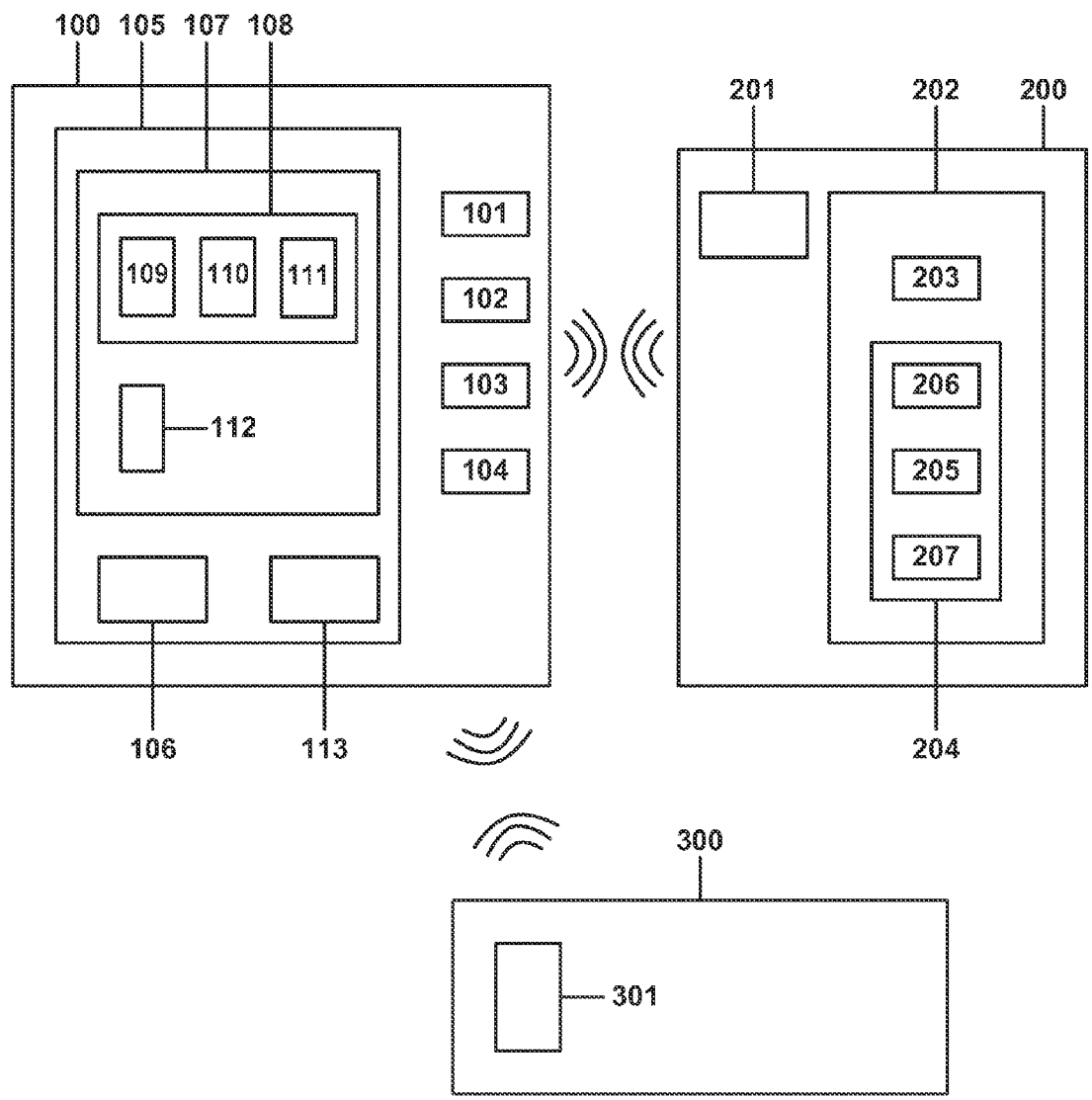
FIG. 1 is a block diagram of an example of a computing system to implement a dynamic payment service in accordance with an embodiment of the invention.

Turning now to FIG. 1, a block diagram of a computer system 1000 to implement a dynamic payment service is shown. The computer system 1000 may include a user device 100, a first vendor dynamic payment service server 200, and a merchant legacy payment system 300. In this embodiment, a user may utilize the user device 100 to request credit from a first credit vendor (hereinafter referred to as "first vendor") operating the first vendor dynamic payment service server 200 in order to purchase an item from a merchant operating the merchant legacy payment system 300. In embodiments of the present invention, the term "item" may be used to describe a good, a service, or anything that may be purchased by the user.

The user device 100 may be, among other things, any programmable machine that may carry out a sequence of logical operations. Examples of the computing device 100 may include, for example, a laptop, desktop, personal digital assistant (PDA), media player, a mobile Internet device (MID), any smart device such as a smart phone, smart tablet, smart TV, or the like. In this embodiment the computing device 100 is a smart phone. The computing device 100 may include a user device processor 101, a user device interface 102, a user device transceiver 103, a user device sensor configuration 104, and a user device memory component 105.

The user device processing component 101 may include at least one computer processor that may be utilized to execute computer-readable executable instructions. For example, as will be discussed in greater detail, the user device processing component 101 may be configured to execute various software applications relating to a dynamic payment service.

The user device interface 102 may be a component configured to allow a user to interact with the user device 100. For example, in this embodiment, the user device interface 102 may be a smart phone screen including a graphical user interface (GUI). In other embodiments, the user device interface 102 may be a laptop screen, a tablet device screen, a desktop monitor, or the like.

The user device transceiver 103 may be a transmitter/receiver that enables the user device 100 to wirelessly communicate with other devices (e.g., the merchant legacy payment system 300). In this embodiment, the user device 100 and the merchant legacy payment system 300 may communicate wirelessly via near-field communication protocol, while the user device 100 and the first vendor dynamic payment service server 200 may communicate wirelessly via a wireless data connection (e.g., IEEE 802.11, 1999 Edition, LAN/MAN Wireless LANS (Wi-Fi), IEEE 802.16-2004, LAN/MAN Broadband Wireless LANS (WiMAX). In other embodiments of the present invention, these devices may communicate via Bluetooth (e.g., IEEE 802.15.1-2005, Wireless Personal Area Networks), Zigbee (IEEE 802.15.4), etc.), a cellular telephone connection (e.g., W-CDMA (UMTS), CDMA2000 (IS-856/IS-2000), etc.), a wired data connection (e.g., RS-232 (Electronic Industries Alliance/EIA), Ethernet (e.g., IEEE 802.3-2005, LAN/MAN CSMA/CD Access Method), power line communication (e.g., X10, IEEE P1675), USB (e.g., Universal Serial Bus 2.0 Specification)), etc., depending upon the circumstances.

The user device sensor configuration 104 may be an arrangement of at least one sensor configured to measure attributes relating to movements of the user device 100. The user device sensor configuration 104 may detect the movements for the purpose of completing a transaction (e.g., a purchase of an item), and may transmit a signal to effect the transaction. In this example, the sensor configuration 104 may include one or more of an accelerometer and a gyroscope.

The user device memory device 105 may be any device configured to store data. In this case, the computing device memory device 105 may store, among other things, a user device dynamic payment application 106, user device secure environment information 107, and purchase item detail information 113.

The user device dynamic payment application 106 may be an application configured to enable the user device 100 to implement the dynamic payment service. For example, the user device dynamic payment application 106 may allow a user to, among other things, establish a secure relationship with a credit vendor, facilitate a user request transaction requesting credit, receive a credit authorization, and execute an credit based transaction with a merchant.

The user device secure environment information 107 may be various information relating to establishing a secure relationship with a credit vendor. For example, the user device secure environment information 107 may include first vendor credit information 108 and second vendor credit information 112. The user device secure environment information 107 may be protected by various security measures (e.g., encryption) utilized by the associated vendors.

The first vendor credit information 108 may be information relating to the relationship of the user of the user device 100 and the first vendor. The first vendor credit information may include first vendor user device identification information 109, first vendor user device authentication information 110, and first vendor transaction information 111.

The first vendor user device identification information 109 may be utilized to identify the user device 100 to the first credit vendor. The first vendor user device identification information 109 may include, for example, the user's name, usernames, passwords, device identification numbers, and the like.

The first vendor user device authentication information 110 may be utilized to authenticate the user device 100 as part of an transaction with the first vendor. The first vendor user device authentication information 110 may include, for example, security keys, security credentials, or the like.

The first vendor credit transaction information 111 may be information received from the first vendor relating to a credit request from the user. This may include, among other things, information relating to the user's (actual) credit request and information relating to a credit request authorization or denial (e.g., an authorization code, a denial statement). As will be discussed in greater detail, in the case of a credit request authorization, the user may utilize the user device dynamic payment application 106 to transmit a payment communication including the first vendor credit transaction information 111 to the merchant legacy payment system 300 to complete a transaction.

The second credit vendor credit information 112 may be information relating to the relationship (of the user device 100) and a second credit vendor (hereinafter "second vendor") that may be required to implement a dynamic payment service between the user of the user device 100 and the second vendor. The second credit vendor information 112 may include, for example, user device identification information, user device authentication information, and credit transaction information. In this embodiment, the user may utilize the user device dynamic payment application 106 to designate the first vendor as the default vendor.

The purchase item detail information 113 may include information describing the nature of the credit transaction requested by the user. The purchase item detail information 113 may allow, among other things, a credit vendor (e.g., the first vendor) to request additional information from the user, evaluate whether to issue credit to the user, and dynamically limit the scope of credit issued to the user for a particular transaction. Examples of the purchase item detail information 113 the purchase detail information 113 may include, for example, a image file of an item's price tag, an item's barcode, or the like.

The first vendor dynamic payment service server 200 may be a computer server system operated by the first vendor to implement a dynamic payment service. The first vendor dynamic payment service server 200 may include, for example, a first vendor dynamic payment service server processor 201 and a first vendor dynamic payment service server memory device 202.

The first vendor dynamic payment service server processor 201 may include at least one computer processor that may be utilized to execute computer-readable executable instructions. For example, as will be discussed in greater detail, the first vendor dynamic payment service server processor 201 may be configured to execute various software applications relating to a dynamic payment service.

The first vendor dynamic payment service server memory device 202 may be any device configured to store data. In this case, the first vendor dynamic payment service server memory device 202 may store, among other things, a first vendor dynamic payment service application 203 and first vendor user device information 204.

The first vendor dynamic payment service application 203 may be configured to enable the first vendor to implement a dynamic payment service. More specifically, the first vendor dynamic payment service application 203 may allow the first vendor to, among other things, identify and authenticate a user requesting a credit transaction, receive information describing details of the requested credit transaction (e.g., the purchase detail information 113), evaluate whether to issue credit, and dynamically limit the scope of credit issued as appropriate for a particular transaction. The first vendor dynamic payment service application 203 may limit the scope of the credit issued by time (e.g., for a period of ten minutes), merchant (e.g., to the particular merchant where the user wishes to purchase an item), the purchase amount, or the number of transactions authorized (e.g., authorized for one transaction only), among other things.

The first vendor user device information 204 may be information relating to the user device 100 that the first vendor may utilize to implement a dynamic payment service. The first vendor user device information 204 may include, for example, first vendor-side user device identification information 205, first vendor-side authentication information 206, and first vendor-side credit transaction information 207.

The first vendor-side user device identification information 205 may be utilized to identify the user device 100 to the first credit vendor. The first vendor-side user device identification information 205 may be particular to the user and may include, for example, the user's name, usernames, passwords, and the like.

The first vendor-side authentication information 206 may be utilized to authenticate the user device 100. The first vendor-side authentication information 206 may be particular to the user, and may include, for example, security keys, security credentials, or the like.

The first vendor-side credit transaction information 207 may be information relating to a credit request from the user. This may include, among other things, information relating to the user's credit request and information relating to a credit request authorization or denial (e.g., an authorization code, a statement of denial). The first vendor-side credit transaction information 207 may be transmitted in a response communication to the user device 100, and may be stored by the user device dynamic payment application 106 as part of the first vendor credit transaction information 111.

The merchant legacy payment system 300 may be a payment system utilized by a merchant to complete purchase transaction with the user. The merchant legacy payment system 300 may include a merchant legacy payment system transceiver 301. The merchant legacy payment system transceiver 301 may, for example, allow the merchant legacy payment system 300 to receive a transmission from the user device 100 including the first vendor credit transaction information 111, and utilize the first credit transaction information 111, and utilize the first credit transaction information 111 to authorize a payment for an item.

The arrangement and numbering of blocks depicted in FIG. 1 is not intended to imply an order of operations to the exclusion of other possibilities. Those of skill in the art will appreciate that the foregoing systems and methods are susceptible of various modifications and alterations.

For example, in the embodiment described in FIG. 1, the user may utilize, among other things, the user device identification information and the user device authentication information to identify and authenticate the user device. However, this need not necessarily be the case. In other embodiments, only one of identification information and authentication information may be sufficient to initiate communication with a credit vendor.

Also, in the embodiment described in FIG. 1, examples of the purchase item detail information include a image file of an item's price tag, an item's barcode, or the like. However, in other embodiments, the user may gather the purchase item detail information in other ways. For example, the user may input the purchase detail information herself (i.e., by hand) by utilizing the user device dynamic payment application 106.

Figure 2:
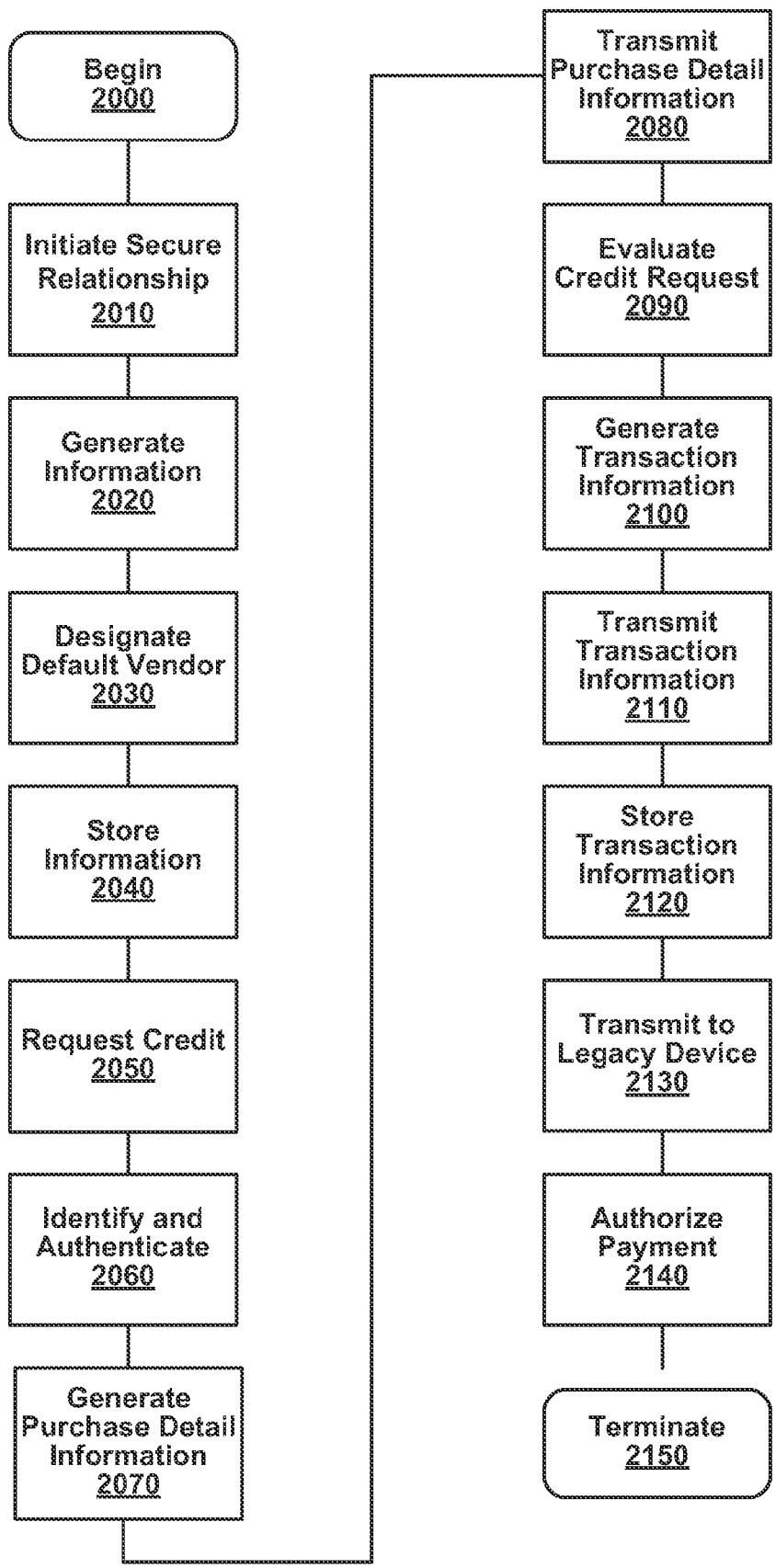
FIG. 2 is a flowchart of an example of a method of implementing a dynamic payment service in accordance with an embodiment of the invention.

Turning now to FIG. 2, a flowchart of an example of a method for implementing a dynamic payment service in accordance with an embodiment of the invention is shown. In this example, a user may utilize a user device dynamic payment application, such as the user device dynamic payment application 106 (FIG. 1), to request credit from a vendor utilizing a first vendor dynamic payment application, such as the first vendor dynamic payment service application 203 (FIG. 1), to purchase an item from a merchant utilizing a legacy payment system, such as the merchant legacy payment system 300 (FIG. 1).

The method might be implemented as a set of logic instructions stored in a machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality logic hardware using circuit technology such as, for example, application specific integrated circuit (ASIC), complementary metal oxide semiconductor (CMOS) or transistor-transistor logic (TTL) technology, or any combination thereof. For example, computer program code to carry out operations shown in the method may be written in any combination of one or more programming languages, including an object oriented programming language such as, for example, Java, Smalltalk, C++ or the like and conventional procedural programming languages, such as, for example, the "C" programming language or similar programming languages.

The process may begin at processing block 2000. At processing block 2010, the user may utilize the user device dynamic payment application to interface with the first vendor dynamic payment service application to generate user device identification information, such as the first credit vendor user device identification information 109 (FIG. 1), and user device authentication information, such as the first credit user device authentication information 110 (FIG. 1). At processing block 2020, the user may utilize the user device dynamic payment application to designate the first vendor as the first vendor.

At processing block 2030, when the user wishes to purchase an item from the merchant, the user may utilize the dynamic payment application to request credit to complete the transaction. At processing block 2040, the user device dynamic payment application may inquire from which vendor to seek credit. At processing block 2050, the user may indicate the default vendor.

At processing 2060, the user may access the user device identification and authentication information to initiate a secure relationship with the first vendor by identifying and authenticating the user device. At processing 2070, the user may utilize the dynamic payment application to generate purchase detail information, such as the purchase detail information 113 (FIG. 1), relating the item to be purchased from the merchant. In this example, the user may scan a barcode for a widget that costs forty dollars. At processing block 2080, the user may utilize the dynamic payment application to transmit a request communication including the identification information, the authentication information, and the purchase detail information to a first vendor dynamic payment service server, such as the first vendor dynamic payment service server 200 (FIG. 1), storing the first vendor dynamic payment application.

At processing block 2090, the first vendor dynamic payment service application may utilize the purchase detail information to evaluate whether to issue credit to the user, and if so, dynamically determine the scope of credit to be issued as appropriate for the request transaction. In this example, the dynamic payment service application may determine that a one-time credit amount of fifty dollars should be issued to the user. The credit may be available for ten minutes (i.e., the user needs to complete the purchase transaction within ten minutes).

At processing block 2100, the first vendor dynamic payment service application may generate transaction information, such as the first vendor-side credit transaction information 207 (FIG. 1), that may be utilized by the user to complete the purchase of the desired item. In this case, the transaction information may include a credit authorization and a credit authorization transaction number. At processing block 2110, the first vendor dynamic payment service application may transmit a response communication including the transaction information to the user device.

At processing block 2120, upon receiving this communication, the user device dynamic payment application may store the transaction information at the user device, such as the first credit vendor credit transaction information 111 (FIG. 1). At processing block 2130, the user device dynamic payment application may transmit a payment communication including the transaction information to a merchant legacy payment device, such as the merchant legacy payment system 300 (FIG. 1). At processing block 2140, the merchant legacy payment device may utilize the communication including the transaction information to authorize payment on the item the user desires. At processing block 2150, the process may terminate.

The sequence and numbering of blocks depicted in FIG. 2 is not intended to imply an order of operations to the exclusion of other possibilities. Those of skill in the art will appreciate that the foregoing systems and methods are susceptible of various modifications, variations, and alterations.

For example, in the embodiment illustrated in FIG. 2, the user device dynamic payment application may inquire from which vendor to seek credit (i.e., the processing block 2040), and the user may indicate the default vendor (i.e., the processing block 2050). However, this need not necessarily be the case. In other embodiments, upon being asked by the user device dynamic payment application, the user may use the user device dynamic payment application to initiate a secure relationship and request credit from a new credit vendor.

Embodiments may therefore provide a method of implementing a dynamic payment service comprising generating a request communication including purchase detail information relating to an item, wherein the request communication requests credit from a vendor to conduct a transaction relating to the item and determining a scope of credit to be issued to conduct the transaction relating to the item based on the purchase detail information. The method may also provide for generating transaction information including the scope of credit to be issued, generating a response communication including the transaction information to respond to the request communication, and generating a payment communication including the transaction information to complete the transaction relating to the item.

In one example, the method may also provide initiating a secure relationship, wherein initiating the secure relationship includes generating one or more of identification information and authentication information relating to a user device and transmitting the user device identification information and the user device authentication information to the vendor.

In another example, the request communication further includes user device identification information and user device authentication information.

In one example, the purchase detail information includes one or more of a price tag of the item and a barcode of the item.

In one example, the scope of the credit to be issued is determined based on one or more of time of availability, merchant, purchase amount, and number of transactions authorized.

In another example, one or more of the request communication and the response communication are encrypted.

In still another example, the method may include designating the vendor as a default vendor.

In another example, the transaction information includes a credit authorization transaction number.

Embodiments may also include at least one machine readable medium comprising a plurality of instructions that in response to being executed on a computing device, cause the computing device to carry out any of the examples of the aforementioned method. In addition, embodiments may include an apparatus including a user interface and logic to carry out any of the examples of the aforementioned method. Also, embodiments may include a system including a memory device, a user interface, and logic to carry out any of the examples of the aforementioned method.

Another embodiment may provide a method of implementing a vendor service, comprising receiving a request communication including purchase detail information to request credit from a vendor to conduct a transaction relating to an item and determining a scope of credit to be issued to conduct the transaction relating to the item based on the purchase detail information. The method may also provide generating transaction information including the scope of credit to be issued and generating a response communication including the transaction information to respond to the request communication.

In one example, the method may provide initiating a secure relationship, wherein initiating the secure relationship includes generating one or more of identification information and authentication information relating to a user device.

In another example, the request communication further includes user device identification information and user device authentication information.

In another example, the purchase detail information includes one or more of a price tag of the item and a barcode of the item.

In one example, the scope of the credit to be issued is determined based on one or more of time of availability, merchant, purchase amount, and number of transactions authorized.

In one example, one or more of the request communication and the response communication are encrypted.

In another example, the transaction information includes a credit authorization transaction number.

Embodiments may also include at least one machine readable medium comprising a plurality of instructions that in response to being executed on a computing device, cause the computing device to carry out any of the examples of the aforementioned method. In addition, embodiments may include an apparatus including a user interface and logic to carry out any of the examples of the aforementioned method. Also, embodiments may include a system including a memory device, a user interface, and logic to carry out any of the examples of the aforementioned method.

Embodiments may also include a method of implementing a dynamic payment service, comprising generating a request communication including purchase detail information relating to an item, wherein the request communication requests credit from a vendor to conduct a transaction relating to an item, receiving a response communication to respond to the request communication including transaction information, wherein the transaction information includes a scope of credit to be issued, and generating a payment communication including the transaction information to complete the transaction relating to the item.

In one example, the request communication further includes user device identification information and user device authentication information.

In another example, the purchase detail information includes one or more of a price tag of the item and a barcode of the item.

In another example, the scope of the credit to be issued is limited based on one or more of time, merchant, the purchase amount, and the number of transactions authorized.

In still another example, one or more of the request communication and the response communication are encrypted.

In one example, the method may provide designating the vendor as a default vendor.

In another example, the transaction information includes a credit authorization transaction number.

Embodiments may also include at least one machine readable medium comprising a plurality of instructions that in response to being executed on a computing device, cause the computing device to carry out any of the examples of the aforementioned method. In addition, embodiments may include an apparatus including a user interface and logic to carry out any of the examples of the aforementioned method. Also, embodiments may include a system including a memory device, a user interface, and logic to carry out any of the examples of the aforementioned method.

Embodiments may also provide a system to implement a dynamic payment service comprising a user device and a dynamic payment service server. The user device may include a device interface, a device processing component, and a purchase request module to generate purchase detail information relating to an item. The user device may also include a request communication module to transmit a request communication including the purchase detail information to request credit to conduct a transaction relating to an item and a device payment module to transmit a payment communication including transaction information to complete the transaction relating to the item. The dynamic payment service server may include a server processing component, a receiving module to module to receive the request communication including the purchase detail information, and a determining module to determine a scope of credit to be issued to conduct the transaction relating to the item based on the purchase detail information. The dynamic payment service server may also include a transaction information module to generate the transaction information including the scope of credit to be issued, and a response module to generate a response communication including the transaction information to respond to the request communication.

Another embodiment may provide a method of implementing a dynamic payment service comprising generating a request communication including purchase detail information relating to an item, wherein the request communication requests credit from a vendor to conduct a transaction relating to the item and determining a scope of credit to be issued to conduct the transaction relating to the item based on the purchase detail information. The method may also provide generating transaction information including the scope of credit to be issued, generating a response communication including the transaction information to respond to the request communication and generating a payment communication including the transaction information to complete the transaction relating to the item.

Still another embodiment may provide at least one computer readable storage medium comprising a set of instructions for implementing a vendor service which, if executed by a processor, cause a computer to receive a request communication including purchase detail information to request credit from a vendor to conduct a transaction relating to an item and determine a scope of credit to be issued to conduct the transaction relating to the item based on the purchase detail information. The set of instruction may also cause a computer to generate transaction information including the scope of credit to be issued and generate a response communication including the transaction information to respond to the request communication.

Yet another embodiment may provide an apparatus for implementing a user service, comprising an interface and a request module to generate a request communication including purchase detail information relating to an item, wherein the request communication is to request credit from a vendor to conduct a transaction relating to an item. The apparatus may also include a response module to receive a response communication including transaction information, wherein the transaction information is to include a scope of credit to be issued and a payment module to generate a payment communication including the transaction information to complete the transaction relating to the item.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Techniques described herein may therefore provide a feed-forward system that ensures both real-time operation of the consumer video pipeline and dynamic updating of the operating pipeline to deliver optimal visual perceptual quality and viewing experience. In particular, a discrete control system for the video pipeline can dynamically adapt operating points in order to optimize a global configuration of interactive component modules that are related to video perceptual quality. In a series configuration, the perceptual quality analysis module may be placed before the video processing pipeline and parameters determined for the post-processing pipeline may be used for the same frame. In the case of distributed computation of the quality analysis block or when perceptual quality analysis needs to be performed at intermediate points in the pipeline, the parameters determined using a given frame may be applied on the next frame to ensure real-time operation. Distributed computation is sometimes beneficial in reducing complexity as certain elements for perceptual quality computation may already be computed in the post-processing pipeline and can be re-used. Illustrated approaches may also be compatible with closed-loop control where the perceptual quality analysis is re-used at the output of the video processing pipeline to estimate output quality, which is also used by the control mechanism.

Embodiments of the present invention are applicable for use with all types of semiconductor integrated circuit ("IC") chips. Examples of these IC chips include but are not limited to processors, controllers, chipset components, programmable logic arrays (PLAs), memory chips, network chips, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments of the present invention are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments of the invention. Further, arrangements may be shown in block diagram form in order to avoid obscuring embodiments of the invention, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments of the invention, it should be apparent to one skilled in the art that embodiments of the invention can be practiced without, or with variation of, these specific details. The description is thus to be regarded as illustrative instead of limiting.

Some embodiments may be implemented, for example, using a machine or tangible computer-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

Those skilled in the art will appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

We claim:

1. A system to implement a dynamic payment service, comprising:
    a user device including,
        a device interface;
        a device processing component;
        a purchase request module to generate purchase detail information relating to an item;
        a request communication module to transmit a request communication including the purchase detail information to request credit to conduct a transaction relating to an item; and
        a device payment module to transmit a payment communication including transaction information to complete the transaction relating to the item; and
    a dynamic payment service server including,
        a server processing component; and
        a receiving module to receive the request communication including the purchase detail information;
        a determining module to determine a scope of credit to be issued to conduct the transaction relating to the item based on the purchase detail information, wherein the determining module comprises a circuit;
        a transaction information module to generate the transaction information including the scope of credit to be issued; and
        a response module to generate a response communication including the transaction information to respond to the request communication.

2. The system of claim 1, wherein the request communication further is to include user device identification information and user device authentication information.

3. The system of claim 1, wherein the purchase detail information is to include one or more of a price tag of the item and a barcode of the item.

4. The system of claim 1, wherein the scope of the credit to be issued is determined based on one or more of time of availability, merchant, purchase amount, and number of transactions authorized.

5. The system of claim 1, wherein one or more of the request communication and the response communication are to be encrypted.

6. The system of claim 1, wherein the user device request module is to designate the vendor as a default vendor.

7. The system of claim 1, wherein the transaction information is to include a credit authorization transaction number.

8. A method of implementing a dynamic payment service, comprising:
    initiating a secure relationship, wherein initiating the secure relationship includes generating one or more of identification information and authentication information relating to a user device;
    using a first processor to generate a request communication including purchase detail information relating to an item, wherein the request communication requests credit from a vendor to conduct a transaction relating to the item;
    determining a scope of credit to be issued to conduct the transaction relating to the item based on the purchase detail information;
    generating transaction information including the scope of credit to be issued;
    using a second processor to generate a response communication including the transaction information to respond to the request communication; and
    generating a payment communication including the transaction information to complete the transaction relating to the item.

9. The method of claim 8, including transmitting the user device identification information and the user device authentication information to the vendor.

10. The method of claim 8, wherein the request communication further includes user device identification information and user device authentication information.

11. The method of claim 8, wherein the purchase detail information includes one or more of a price tag of the item and a barcode of the item.

12. The method of claim 8, wherein the scope of the credit to be issued is determined based on one or more of time of availability, merchant, purchase amount, and number of transactions authorized.

13. The method of claim 8, wherein one or more of the request communication and the response communication are encrypted.

14. The method of claim 8, including designating the vendor as a default vendor.

15. The method of claim 8, wherein the transaction information includes a credit authorization transaction number.

16. At least one non-transitory computer readable storage medium comprising a set of instructions for implementing a vendor service which, if executed by a processor, cause a computer to:
   initiate a secure relationship, wherein initiating the secure relationship is to include generating one or more of identification information and authentication information relating to a user device;
   receive a request communication including purchase detail information to request credit from a vendor to conduct a transaction relating to an item;
   determine a scope of credit to be issued to conduct the transaction relating to the item based on the purchase detail information; and
   generate transaction information including the scope of credit to be issued; and
   generate a response communication including the transaction information to respond to the request communication.

17. The at least one computer readable storage medium of claim 16, wherein the request communication further is to include user device identification information and user device authentication information.

18. The at least one computer readable storage medium of claim 16, wherein the purchase detail information is to include one or more of a price tag of the item and a barcode of the item.

19. The at least one computer readable storage medium of claim 16, wherein the scope of the credit to be issued is determined based on one or more of time of availability, merchant, purchase amount, and number of transactions authorized.

20. The at least one computer readable storage medium of claim 16, wherein one or more of the request communication and the response communication are to be encrypted.

21. The at least one computer readable storage medium of claim 16, wherein the transaction information is to include a credit authorization transaction number.

22. An apparatus for implementing a user service, comprising:
   a processor;
   an interface;
   a request module to generate a request communication including purchase detail information relating to an item, wherein the request communication is to request credit from a vendor to conduct a transaction relating to an item, and wherein the request communication is to further include user device identification information and user device authentication information;
   a response module to receive a response communication including transaction information, wherein the transaction information is to include a scope of credit to be issued; and
   a payment module to generate a payment communication including the transaction information to complete the transaction relating to the item.

23. The apparatus of claim 22, wherein the purchase detail information is to include one or more of a price tag of the item and a barcode of the item.

24. The apparatus of claim 22, wherein the scope of the credit to be issued is to be limited based on one or more of time, merchant, the purchase amount, and the number of transactions authorized.

25. The apparatus of claim 22, wherein one or more of the request communication and the response communication are to be encrypted.

26. The apparatus of claim 22, further including a designation module to designate the vendor as a default vendor.

27. The apparatus of claim 22, wherein the transaction information is to include a credit authorization transaction number.

* * * * *